United States Patent

[11] 3,542,376

[72] Inventor Roger D. Dykehouse
 Spring Lake, Michigan
[21] Appl. No. 713,026
[22] Filed March 14, 1968
[45] Patented Nov. 24, 1970
[73] Assignee Sealed Power Corporation
 Muskegon, Michigan
 a corporation of Michigan

[54] PISTON AND RING CONSTRUCTION
 9 Claims, 12 Drawing Figs.
[52] U.S. Cl. ................................................ 277/58,
 277/157, 277/216, 277/212
[51] Int. Cl. ................................................ F16j 9/02
[50] Field of Search ........................................ 277/157-
 163, 216, 58, 217, 212, 212C, ATD

[56] References Cited
UNITED STATES PATENTS

| | | | | |
|---|---|---|---|---|
| 1,320,210 | 10/1919 | Eckelbarger | | 92/246 |
| 1,364,005 | 12/1920 | Sullivan | | 92/246 |
| 1,651,721 | 12/1927 | Lemery | | 277/214 |
| 1,704,700 | 3/1929 | Day | | 92/246 |
| 1,737,056 | 11/1929 | Mueller | | 92/246X |
| 3,066,943 | 12/1962 | Brenneke | | 277/163UX |
| 3,341,209 | 9/1967 | Prasse et al. | | 277/160 |
| 2,754,165 | 7/1956 | Quade | | 277/161 |

FOREIGN PATENTS

| | | | |
|---|---|---|---|
| 761,049 | 3/1934 | France | 277/216 |
| 499,237 | 1/1939 | Great Britain | |

Primary Examiner—Laverne D. Geiger
Assistant Examiner—Jeffrey S. Mednick
Attorney—Barnes, Kisselle, Raisch & Choate ABSTRACT: An internal combustion engine piston grooved in the usual manner to receive the customary oil control ring assembly in the lowermost groove and the usual second compression ring in the middle groove, but having a third and uppermost ring groove disposed adjacent the top of the piston head land which receives an L-shaped head land ring. The upper end of the axial leg of the head land ring is disposed flush with or very close to the top surface of the piston and an annular clearance space between the axial leg and groove back wall communicates at all times directly with the combustion chamber. The head land ring is a split ring having a very small working gap and essentially zero self-biasing tension at operating diameter, and under high load conditions in four-cycle engines is primarily actuated by gas pressure forces existent during operation of the engine, and is very effective in reducing blowby. Under light load conditions the head land ring may be assisted in maintaining oil control by providing an expander spring behind it and/or the second compression ring, by increasing the tension of the oil ring and/or by likewise modifying the head land ring. Various preferred cross sectional configurations and dimensional ratios for the head land ring are disclosed, as well as expanders to be used in conjunction with the head land ring. The head land ring may also be used superposed with the usual three ring set of a top compression ring, middle compression and oil ring.

INVENTOR
ROGER D. DYKEHOUSE

ATTORNEYS

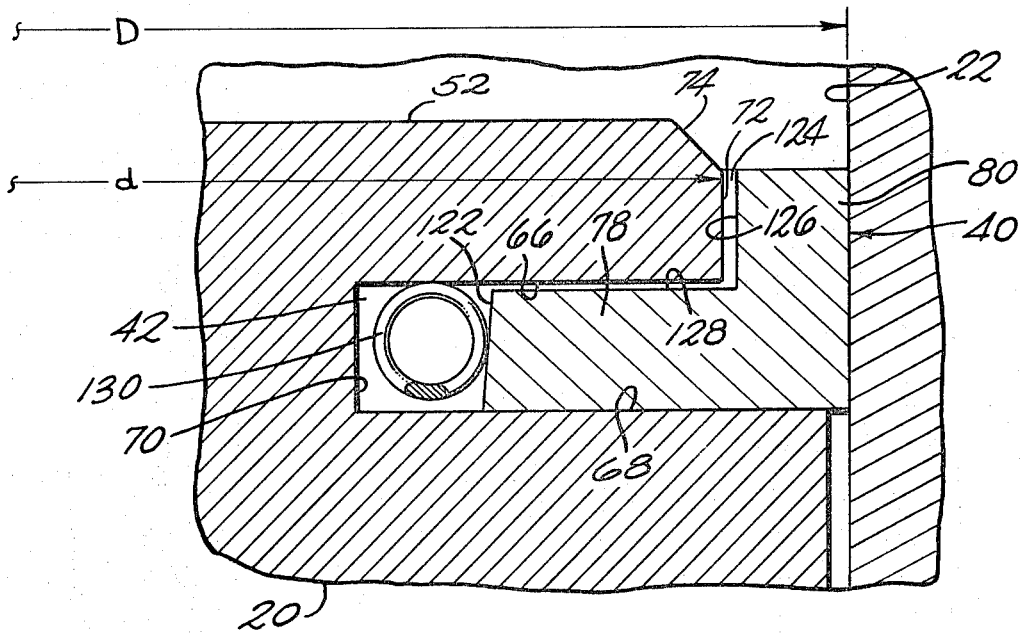
FIG. 4
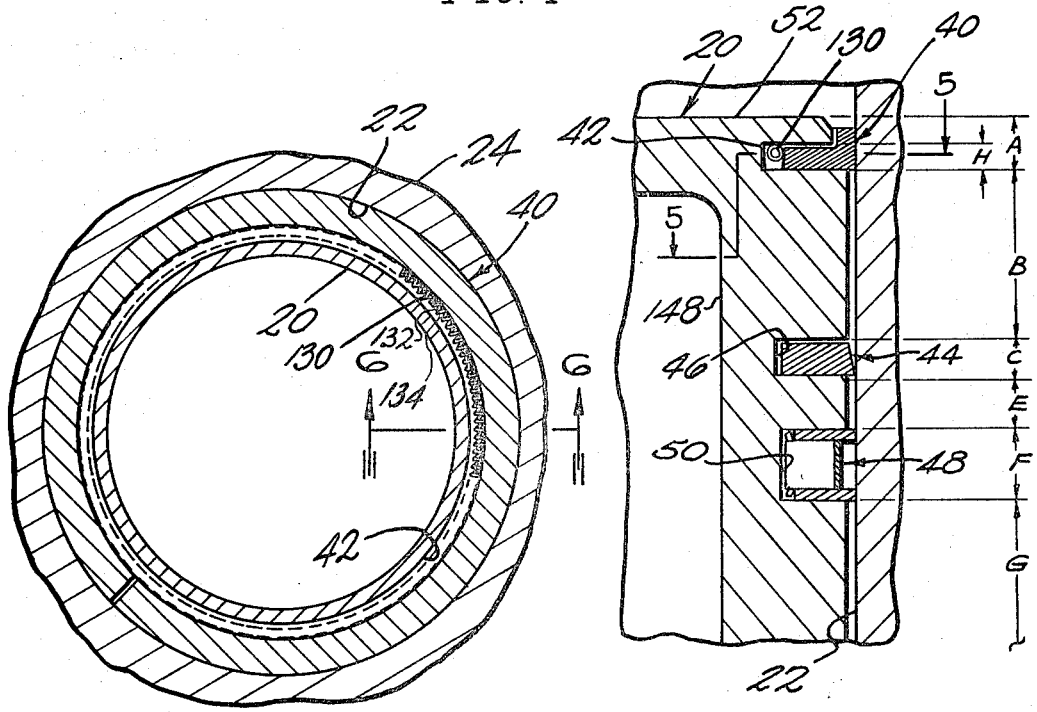
FIG. 5
FIG. 6
INVENTOR
ROGER D. DYKEHOUSE
BY Barnes, Kisselle, Raisch & Choate
ATTORNEYS

INVENTOR
ROGER D. DYKEHOUSE

BY Barnes, Kisselle, Raisch & Choate

ATTORNEYS

PISTON AND RING CONSTRUCTION

An object of the present invention is to provide an improved piston and piston ring arrangement for an internal combustion engine which: (1) provides good oil control while greatly reducing the amount of blowby leakage from the combustion chamber to the crankcase of the engine, (2) reduces wear on the rings and cylinder bore, (3) provides an increase in the engine compression ratio, (4) reduces exhaust hydrocarbon emission, (5) permits a foreshortening of the piston between the top deck of the piston and the wrist pin, (6) eliminates formation of a wear-induced ridge in the cylinder bore above the upper limit of top ring travel, (7) reduces the surface to volume ratio of the combustion chamber (8) reduces piston operating temperature, (9) increases engine power output and/or (10) reduces deposit buildup in the piston ring belt area.

Other objects, features and advantages of the present invention will become apparent from the following detailed description taken in conjunction with the accompanying drawings wherein:

FIG. 4 is a fragmentary vertical section along the axis of the piston, head land ring and cylinder bore of FIG. 1.

FIG. 5 is a horizontal sectional view taken on the line 5–5 of FIG. 6.

FIG. 6 is a vertical section taken on the line 6–6 of FIG. 5 illustrating the preferred arrangement of piston rings on a piston of the invention.

Figure 1:
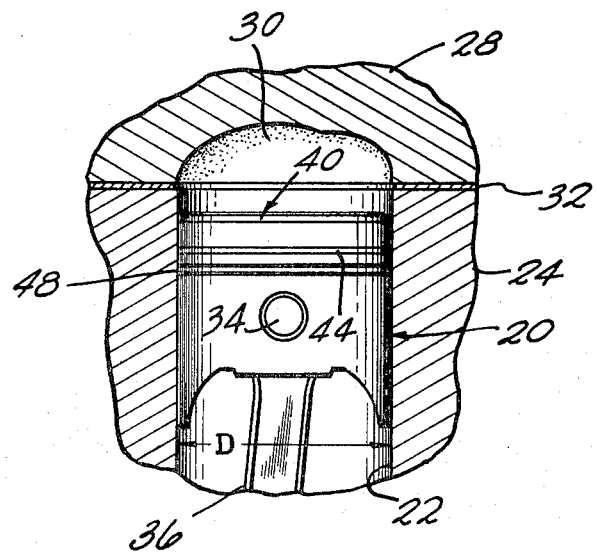
FIG. 1 is a vertical fragmentary sectional view of a portion of an internal combustion engine illustrating a piston and ring arrangement of the present invention received in a cylinder bore of the engine.

Referring in more detail to FIG. 1 and 6, an exemplary but preferred embodiment of a piston 20 constructed in accordance with the present invention is shown slidably received for reciprocation in a cylinder bore 22 in the block 24 of an internal combustion engine. The usual head 28 with a conventional combustion chamber 30 formed therein is secured to block 24 and sealed by a head gasket 32. A wrist pin connects piston 20 to a connecting rod 36 of the engine. The remainder of the engine is not shown since it may be any reciprocating internal combustion engine either spark ignited or compression ignited of the type currently used in vehicles. The diameter of cylinder bore 22 in such engines usually ranges from 3 to 6 inches, and the piston and ring arrangement and dimensional relationships described hereinafter are primarily intended for use in this environment.

Piston 20, except for the ring grooving as described hereinafter, is generally conventional and may be of cast or forged aluminum construction. As best seen in FIG. 6 piston 20 is provided with a set of three rings, a head land ring 40 disposed in a circumferentially continuous groove 42, a middle compression ring 44 disposed in a circumferentially continuous groove 46 and a three-piece oil ring 48 disposed in a similar groove 50. Ring 48 is preferably a dual rail oil ring such as that disclosed in the U.S. Olson Pat. No. 2,789,872. Ring 44 is preferably a split ring segment made of solid cast iron and having a tapered cylinder wall engaging face. Ring 44 is a self-tensioning type compression ring wherein the radially outwardly biasing force is developed by the resilience of the ring material as it is stressed in being contracted to operating diameter. However, ring 44 may be augmented by a spring expander, preferably of the ribbon, radially bowed, bottoming type (not shown) to assist in biasing ring 44 radially outwardly and thereby provide good oil control under light load, high vacuum engine operating conditions. Groove 50 is provided with suitable oil drainage passages (not shown) connecting the groove with the hollow interior of pistons 20 whereas groove 46 is in an unventilated groove.

Figure 12:
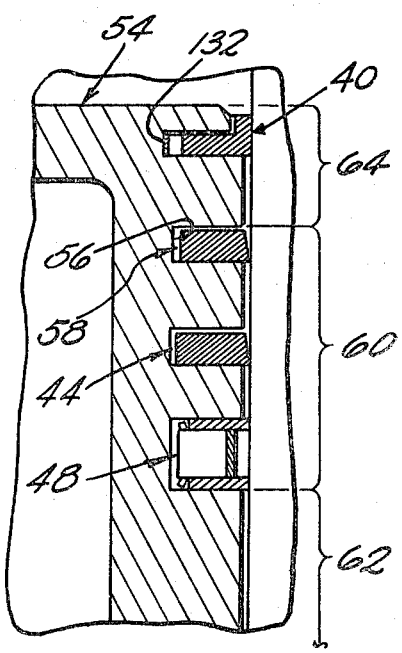
FIG. 12 is a fragmentary vertical section of another piston and ring combination of the invention.

As will be evident from the axial piston ring dimensions indicated A, B, C, E, F, G and H shown in FIG. 6 and specified hereinafter, oil ring 48 and middle compression ring 44 are located in their usual positions between wrist pin 34 (FIG. 1) and the upper end surface or deck 52 of piston 20. However, head land ring 40 is located at or closely adjacent the upper end of the piston rather than at the usual location of a top compression ring. In other words, the usual location of a top compression ring is normally lower, as shown in FIG. 12 wherein a piston 54, similar to piston 20, has the usual top compression ring groove 56 located between grooves 42 and 46 which receives the usual self-biasing cast iron compression ring 58. Thus rings 58, 44 and 48 are located in what is the usual ring belt portion 60 of the piston which in turn is intermediate the skirt portion 62 and head land portion 64 of the piston. Ring 40 is thus located in and adjacent the upper end of what would be the usual head land portion 64 of pistons 20 and 54.

Referring to FIG. 4, groove 42 is defined by parallel, circumferentially continuous and radially extending top and bottom walls 66 and 68 respectively, by a circumferentially continuous and axially extending backwall 70 and by a circumferentially continuous and axially extending front wall 72. Wall 72 has a diameter $d$ about .125 inches less than the theoretical diameter of the cylinder bore 22 so that the groove 42 opens directly to combustion chamber 30. Preferably the top edge of piston 20 is chamfered to provide a beveled surface 74 intersecting surfaces 52 and 72 at about a 45° angle, with the intersection of surfaces 74 and 72 being about halfway between surface 52 and wall 66. This chamfer reduces the chances of chipping the top edge of the piston during handling in manufacturing and service and promotes the flow of gases from the combustion chamber to groove 42.

Figure 3:
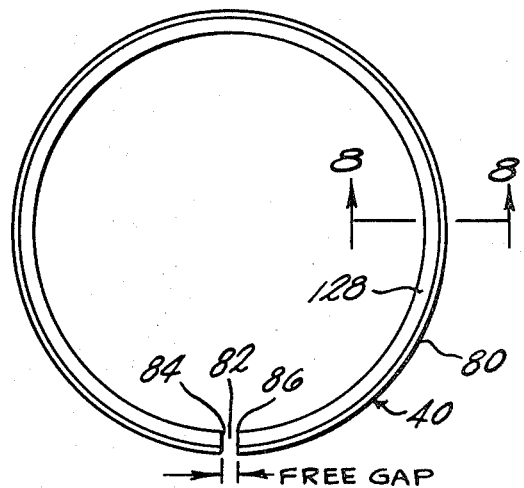
FIG. 3 is a top plan view illustrating a head land ring of the present invention shown by itself.
Figure 8:
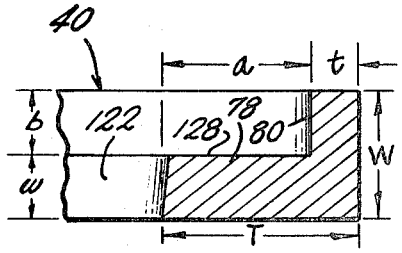
FIG. 8 is a vertical section on the line 8–8 of FIG. 3.

As best seen in FIG. 3, 4 and 8, ring 40 is generally L-shaped in radial cross section with the long leg 78 extending radially between walls 66 and 68 and having a radial thickness dimension T and an axial width dimension w. The short leg or lip 80 of ring 40 extends axially of the ring and has a radial thickness dimension $t$ and an axial dimension $b$. Ring 40 is preferably constructed such that the lip thickness $t$ equals .045/.050 inches, where the outside diameter of ring 40 at operating diameter, which corresponds to the theoretical inside diameter D of bore 22, is in the range of from about 3 inches to 4½ inches. The overall radial thickness T of ring 40 is preferably .140 inches where D is in the aforementioned range. Regardless of the dimension D, T is relatively thin compared to conventional compression ring D/T dimensional ratios. The reason for this is that ring 40 is essentially a "dead" ring, which means that its outside diameter in its free or relaxed condition, unconfined by the cylinder bore or piston, is the same as or very close to its final operating diameter D. Thus as viewed in FIG. 3, wherein ring 40 is shown in its free state, a free gap 82, which may be as much as about .125 inches maximum but preferably less than this, exists between the parted ends 84 and 86 of ring 40. When ring 40 is at operating diameter D the working gap between ends 84 and 86 preferably should be zero, but due to manufacturing tolerances and thermal expansion of the ring under operating conditions it is usually necessary to specify a gap of between .005 to .015 inches when ring 40 is gauged to diameter D. Because ring 40 is a dead ring with a very small free gap, it is necessary to have a low radial thickness T so that ring 40 is not overstressed when its free ends 84 and 86 are spread apart to expand the ring and slip it downwardly past wall 72 when installing the ring in groove 42.

Generally speaking dimension W is relatively wide, on the order of .125 inches, as compared to the .0625 inches axial width dimension of some prior known pressure backed compression rings of equivalent diameter. With such a wide ring and considering its unbalanced L-shaped radial cross section, it is important that ring 40 approach as closely as possible a zero tension ring ("dead" ring) wherein the free gap and working gap are equal so that the ring is not stressed in bringing it to operating diameter. Otherwise ring 40 will twist or dish as it is stressed in closing, which condition has been found to promote sluggish action of ring 40 in groove 42 and poor sealing against bottom wall 68. Preferably, the ratio of the overall axial width W of ring 40 to the axial width w of leg 78 is 2:1. However in some instances for manufacturing reasons as well as to reduce the gas developed radial loading of the ring, it may be desirable to modify this ratio to somewhat less than 2:1.

Figure 7:
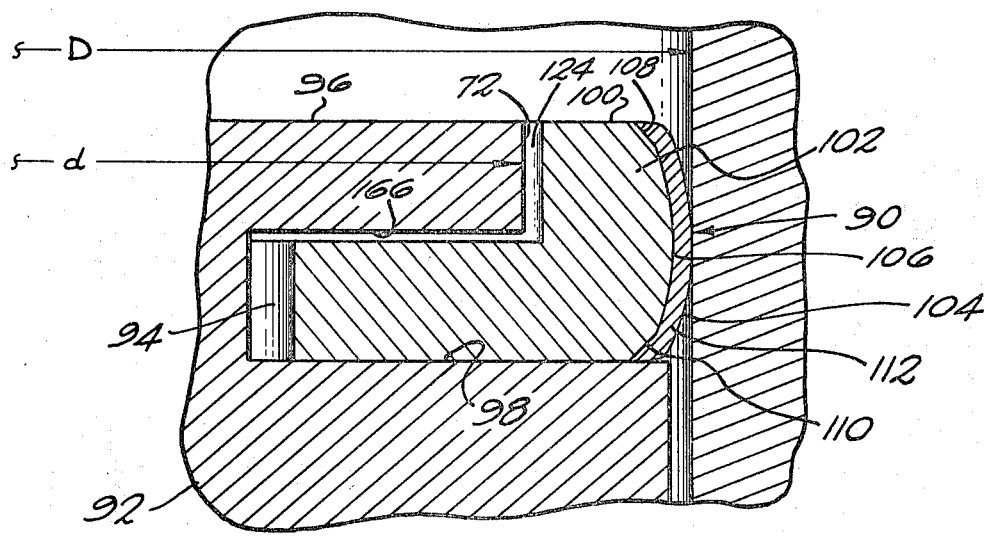
FIG. 7 is a vertical section along the axis of a second embodiment of a piston and piston ring combination of the invention.

Within the scope of the above described dimensional and cross-sectional configuration characteristics, the head land ring of the present invention may be varied in several respects as illustrated by way of example in FIGS. 7, 9, 10 and 11 respectively. In FIG. 7, a head land ring 90 is shown mounted in a piston 92 which may be identical to piston 20 described previously except that the groove 94 is formed closer to the deck 96 of the piston. Preferably in this embodiment when the ring 90 rests on the bottom wall 98 of the groove the upper surface 100 of lip 102 of ring 90 is disposed flush with surface 96. Ring 90 has what is known as a radiused face 104, e.g., a convex scraping surface having its crown located within .015 inches of the centerline of the overall axial dimension W of ring 90. Ring 90 may be made from cast iron or steel and its initially bare outer face 106 is turned down to the curvature shown in FIG. 7 and chamfered edges 108 and 110 formed at its upper and lower corners respectively. The entire face 106 may then be chrome plated with a layer of chromium 112 to a thickness of about .002 to .008 inches. The chrome plate may be lapped to generally the same curvature as face 106, or only slightly lapped, to obtain a 360° contact with bore 22.

Figure 9:
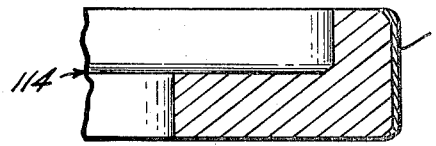
FIGS. 9, 10 and 11 are vertical sections similar to FIG. 8 but illustrating third, fourth and fifth embodiments of head land rings of the invention.
Figure 10:
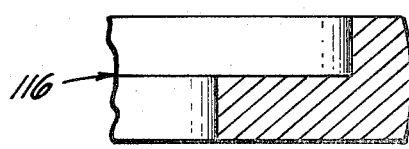
Figure 11:
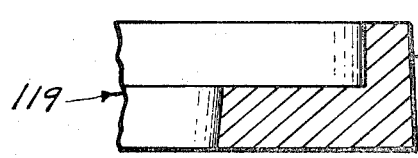

The head land ring 114 shown in FIG. 9 closely resembles ring 40 except that it illustrates a straight outer face electroplated with a layer of chromium 118 and rounded off at the upper and lower edges. Ring 116 of FIG. 10 is made of cast iron and has a bare radiused face 120 turned on the outer periphery of the ring. Ring 119 of FIG. 11 is also similar to ring 40 except that its outer face 121 is frustoconical rather than cylindrical, being inclined upwardly and inwardly at about one degree relative to the axis of ring 119.

Other surface treatments of the above described head land rings may be provided, such as grooving the outer face and filling the groove with molybdenum or other wear resistant materials.

Although excellent results have been obtained with the above described head land rings of the invention without any auxiliary expander spring means used with the ring, in some cases of high vacuum and light load it is desirable to provide a spring expander to engage the inner periphery 122 of ring 40 to develop a light outwardly acting biasing force on the ring to aid in oil control. This insures that a slightly undersized diameter ring, whether manufactured this way or as a result of wear, is always biased lightly into contact with the cylinder bore wall 22 even in the absence of gas pressure augmentation, thereby insuring that the annular space 124 between face 72 and the inner periphery 126 of lip 80 (FIG. 4) is maintained open to allow combustion chamber gases ready access to space 124 and to the clearance space between groove wall 66 and the upper surface 128 of leg 78 of the ring. Also, it has been found that a side clearance between the leg 78 and walls 66 and 68 of the groove on the order of .001 to .004 inches provides good results.

One form of expander spring suitable for this purpose is a nonbottoming compression coil spring expander 130 of conventional construction dimensioned to abut at its split ends 132 and 134 (FIG. 5) when disposed in groove 42 as shown in FIGS. 4 and 5. For a ring 40 dimensioned as set forth previously, expander 130 may be made of spring wire having a diameter of .010 to .020 inches and with its convolutions having an outside diameter of about .060 inches. Preferably the inner periphery 122 of leg 78 is inclined at about 5° to 10° from the axis of ring 40 to provide a downwardly and inwardly tapering frustoconical surface against which expander 130 abuts. This inclination develops a light side sealing force on ring 40 to force the lower side of the ring against bottom wall 68 of the groove, expander 130 in turn reacting against upper wall 66 of the groove. Other forms of expander springs may be used in conjunction with ring 40 such as the conventional ribbon bottoming type expander 132 shown in FIG. 11.

In operation, the head land rings 40, 90, 114, 116 of the present invention are responsive to and actuated by the gas pressure developed in the combustion chamber of the engine to develop their compression and combustion sealing action against the wall of cylinder bore 22. Due to the large clearance space 124 behind the lip of the ring, the gas pressure acting behind the ring tending to force it radially outwardly is sufficient to counteract the inward force exerted by high-pressure gas seeping past the outer periphery of the ring. Consequently, radial collapse of the ring and the consequent excessive blowby are prevented, even at high engine speeds when the inertial forces acting on the ring are sufficient to lift the ring upwardly off of the lower wall 68 of the groove. If such lifting does occur, it does not close space 124. At normal running speeds the head land ring is also advantageous because the ring exerts a very low radial force against the cylinder wall during most of the engine cycle, gas pressure augmenting the ring to expand it radially outwardly only at the necessary periods during the cycle and with just sufficient force to insure gas control.

Although the action is not completely understood, the head land ring does not appear to become frozen in groove 42 by accumulations of carbon deposits in spite of the large clearance space 124. Because ring 40 is a dead ring, there is little or no tendency for the ring to twist in the groove, a condition which prevents good blowby control and performance. It has also been found that a radius face such as 104 or 120 on the cylinder wall engaging surface of the ring is superior to a straight face for obtaining oil control. Moreover, a head land ring constructed and mounted on a piston as described previously has been found to control blowby best when the working gap is very small or even when the free ends 84 and 86 of the ring are slightly abutted. Surprisingly, no scuffing of the ring and/or bore wall has been found to occur as would occur with a conventional ring in the usual top ring location when the ends are so abutted. Test results have also shown that although the usual top compression ring 58 of the FIG. 12 arrangement can be eliminated as in the arrangement shown in FIG. 6, it is not desirable to eliminate the middle compression ring 44 nor the oil control ring 48. However, a second oil control ring (not shown) may be substituted for the middle compression ring 44 to augment ring 48 without thereby losing control of compression sealing.

Figure 2:
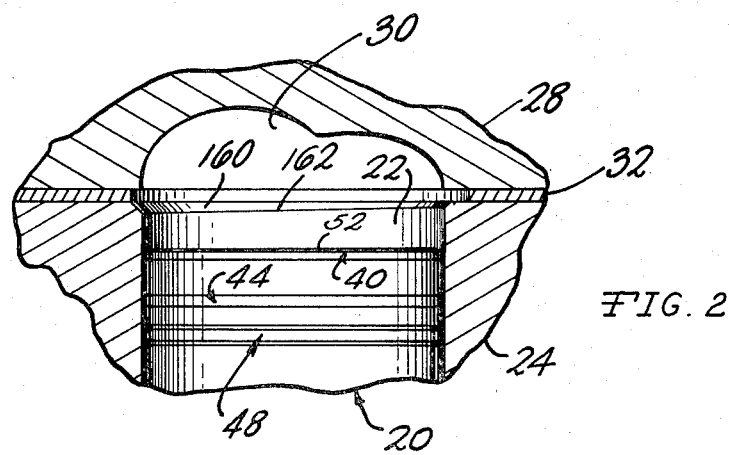
FIG. 2 is a fragmentary view slightly enlarged over that of FIG. 1 illustrating the piston of FIG. 1 near top dead center and showing on a greatly exaggerated scale a misalined, non-concentric chamfer at the upper end of the cylinder bore.

In addition to the features and advantages described above, the head land rings 40, 90, 114 and 116 and pistons 20, 54 and 92 of the invention provide an increased compression ratio compared to the conventional automotive piston equipped with the usual top and middle compression rings and oil ring in the ring belt portion 60 of the piston. This is due to the head land ring being located with the top surface of lip 80 flush with or within one-sixteenth inch of the piston deck 52. Hence the annular void between portion 64 (FIG. 11) of the piston and the cylinder bore no longer is open to the combustion chamber and hence this volume is removed from the combustion chamber. Likewise, due to the head land ring sealing off this annular void, combustion is improved and exhaust hydrocarbon emissions are reduced. The reduction in combustion chamber surface/volume ratio also has a favorable effect on reducing exhaust hydrocarbon emissions and improving engine thermal efficiency. The provision of the head land ring at the top of the piston head land also eliminates the formation of carbon deposits on the head land portion 64 which lead to bore wear and marking. Although the flush relationship of the FIG. 7 arrangement provides good results in terms of performance, dropping the head land ring slightly to the FIG. 4 relationship is advantageous in preventing land breaking, and also provides added tolerance to insure that the outer face of the head land ring does not travel more than halfway (on the ring face) past the intersection 162 of the cylindrical wall of bore 22 with the usual chamfer 160 shown on exaggerated scale in FIG. 2. However, it is desirable to have the head land ring travel partially past intersection 162 since this has been found effective in eliminating the formation of a ridge in bore 22 which otherwise occurs above the upper limit of top ring travel due to wear of the bore. This chamfer 160 is formed by the engine builder at the upper end of the bore, and due to manufacturing tolerances may be formed about a centerline line eccentric to the centerline of bore 22, thereby causing intersection 162 of the chamfer with the bore to drop further than specification. Hence dropping the head land ring slightly on the piston head land accommodates this condition and avoids the undesirable possibility of more than one-half of the head land ring traveling past intersection 162.

By way of example and not by way of limitation, a piston and head land ring combination construction in accordance with the present invention and arranged as shown in FIG. 6 produced excellent blowby control without sacrificing oil control using the following dimensions and dimensional relationships:

| | |
|---|---|
| A—axial distance from piston deck 52 to groove bottom wall 68 | .180 to .190 inch. |
| B—axial distance from the bottom wall 68 of groove 42 to the top wall of groove 46 | .440 inch. |
| C—axial width of groove 46 | .080 to .081 inch. |
| E—axial distance between grooves 46 and 50 | .125 inch. |
| F—axial dimension of oil groove 50 | .188 to .189 inch. |
| G—axial distance from the bottom wall of groove 50 to the lower-most edge of the skirt portion 62 of the piston | 2.7 inch. |
| H—axial distance between top and bottom wall 66 and 68 of groove 42 | .0645 to .0655 inch. |
| d—diameter of head land wall 72 | D minus .125 inch. |
| Root diameter of groove 94 | D minus .440 inch. |
| T—radial thickness of ring 40 | .140 inch. |
| D—gauge diameter of ring 40 at theoretical operating diameter | 4.0 inch. |
| W—axial width of ring 40 | .122 to .124 inch. |
| w—axial width of leg 78 | .0615 to .0635 inch. |
| t—radial thickness of lip 80 | .045 to .050 inch. |
| Radial clearance between surfaces 72 and 126 | .010 to .015 inch. |

I claim:

1. In combination, a piston for an internal combustion engine cylinder, said piston having an end surface adapted to form one wall of a combustion chamber of the engine cylinder and having an outer circumferential portion comprising at least a head land portion with a groove therein and a skirt portion, said head land groove having axially spaced top and bottom walls, said top wall being closer than said bottom wall to said end surface and having an outer edge disposed radially inwardly of the outer edge of said bottom wall, said head land portion having a peripheral surface extending axially of said piston between said outer edge of said top wall and said end surface of said piston, a head land ring received in said head land groove comprising a one-piece split annulus generally L-shaped in a radial plane containing the axis of said ring, said ring having a radial leg disposed between said top and bottom walls of said head land groove with an axial clearance space between said top wall and radial leg and having an axial leg disposed radially outwardly of said head land peripheral surface with a radial clearance space therebetween, the inner periphery and top surface of said radial leg and the inner periphery of said axial leg being exposed to gas pressure in the combustion chamber via said clearance spaces for combustion chamber pressure actuation of said head land ring, said radial leg having a bottom surface adapted to seat flat against said bottom wall of said groove when the outer periphery of said axial leg is in sliding engagement with the wall of the cylinder, the difference in the circumferential dimensions of the free and working gaps between the parted ends of said head land ring at said split being sufficiently small such that said head land ring at operating diameter is substantially free of internal twisting stresses acting to lift said radial leg bottom surface away from a flat seating on said bottom wall of said groove, and an annular spring expander disposed between said top and bottom walls of said groove in relatively light radially outwardly biasing engagement with the inner periphery of said radial leg when said ring is at operating diameter whereby said expander supports said head land ring against radial collapse thereof, the inner periphery of said radial leg being inclined at an angle from the axis of said ring so as to taper outwardly toward said end surface of said piston whereby said expander develops axial biasing force on said head land ring to help maintain said bottom surface of said head land ring seated on said groove bottom wall.

2. The combination set forth in claim 1 wherein the total axial width of said axial leg of said head land ring is on the order of twice that of said radial leg of said head land ring.

3. The combination set forth in claim 1 wherein said expander comprises a coil spring of the nonbottoming type bearing against said tapered inner periphery of said head land ring and against said top wall of said groove.

4. The combination set forth in claim 3 wherein said head land ring has an outer periphery of convex curvature in said radial plane.

5. The combination set forth in claim 4 wherein said head land ring has an overall radial thickness T equal to about D/26 where D is the outside diameter of said head land ring at theoretical operating diameter and D is in the range of from about 3 to 6 inches, wherein said axial leg of said head land ring has a radial thickness $t$ in the range of about .045 to .050 inches, wherein said overall axial width of said head land ring is in the order of .125 inches and wherein the axial width $w$ of said radial leg of said head land ring is in the order of about .0625 inches.

6. The combination set forth in claim 1 wherein said circumferential portion of said piston has a ring belt portion disposed axially between said head land portion and said skirt portion, said ring belt portion having a compression ring groove therein adjacent said head land portion and an oil ring groove therein adjacent said skirt portion, and further including a self-biasing split compression ring in said compression ring groove and a self-biasing split dual rail oil ring assembly in said oil ring groove.

7. The combination set forth in claim 6 further including a spring expander disposed in said compression ring groove in radially outwardly biasing engagement with said compression ring.

8. The combination set forth in claim 6 wherein said ring belt portion has a second compression ring groove disposed between said first-mentioned compression ring groove and said head land ring groove, and further including a self-biasing split compression ring disposed in said second compression ring groove, and wherein said head land ring groove, said first and second compression ring grooves and said oil ring groove are all located within a distance in the order of about one inch measured axially of said piston from said end surface thereof.

9. A head land ring assembly for use in a piston for an internal combustion engine cylinder wherein the piston has an end surface adapted to form one wall of a combustion chamber of the engine cylinder and has an outer circumferential portion comprising at least a head land portion with a groove therein and a skirt portion, the head land groove having axially spaced top and bottom walls with the top wall being closer than the bottom wall to the piston end surface and having an outer edge disposed radially inwardly of the outer edge of the bottom wall, and wherein the head land portion has a peripheral surface extending axially of the piston between the outer edge of the top wall and the end surface of said piston; said head land ring assembly being adapted to be received in said head land groove and comprising a one-piece split annulus generally L-shaped in a radial plane containing the axis of the ring, said ring having a radial leg adapted to be disposed with a clearance between said top and bottom walls of said head land groove and an axial leg adapted to be disposed radially outwardly of the head land peripheral surface with a clearance therebetween to establish communication between the combustion chamber and the inner periphery of said radial leg via said clearances, said radial leg having a bottom surface adapted to seat flat against the bottom wall of the groove when the outer periphery of said axial leg is disposed in operative engagement with the wall of the cylinder, the difference in the circumferential dimensions of the free and working gaps between the parted ends of said head land ring at said split being sufficiently small such that said head land ring at operating diameter is substantially free of internal twisting stresses acting to lift said radial leg bottom surface away from a flat seating on the bottom wall of the groove, and an annular spring expander in relatively light radially outwardly biasing engagement with the inner periphery of said radial leg when said ring is at operating diameter to support said ring against radial collapse thereof, the inner periphery of said radial leg being inclined at an angle from the axis of said ring so as to taper outwardly away from said bottom surface of said ring whereby said expander develops axial biasing pressure on said ring to help maintain said bottom surface of said head land ring seated on the groove bottom wall.